Patented June 29, 1954

2,682,512

UNITED STATES PATENT OFFICE 2,682,512

UNSATURATED ORGANOSILANES AND
METHOD OF MAKING SAME

Courtland L. Agre, St. Paul, Minn., assignor to
Minnesota Mining & Manufacturing Company,
St. Paul, Minn., a corporation of Delaware No Drawing. Application August 2, 1948,
Serial No. 42,145

10 Claims. (Cl. 260—2)

This invention relates to organosilicon compounds and methods of preparation. An exemplary specific compound with which the invention is particularly concerned is dichlorovinyl trichlorosilane, prepared by a process as hereinafter described from trichloroethylene and trichlorosilane.

At relatively low temperatures and in the presence of a catalyst, e. g. benzoyl peroxide, many ethylenic compounds have been shown to react with substituted silanes such as trichlorosilane to produce saturated addition products.

At high temperatures, certain classes of organic compounds decompose to split off small molecules and form unsaturated carbon-carbon linkages. Thus, organic compounds having hydrogen and chlorine atoms respectively attached to adjacent carbon atoms tend to split out hydrogen chloride with the production of an ethylenic or acetylenic bond.

Acetylenic bonds are highly reactive and unstable. Dichloroacetylene, for example, has been reported to be dangerously unstable, particularly at high temperatures or in the presence of oxygen. Hence the addition of trichlorosilane to acetylenic compounds such as dichloroacetylene would be expected to involve considerable risk. Furthermore, in view of the known reactivity of ethylenic bonds with trichlorosilane and the like, there would be little hope of obtaining unsaturated organosilicon compounds from reactions between acetylenic compounds and trichlorosilane. Perhaps for these reasons, no one prior to the present invention had, so fas as I am aware, ever attempted or even suggested the reactions with which this invention is particularly concerned, or had ever obtained the novel specific products herein claimed.

My process comprises heating an organic compound such as trichloroethylene in the presence of a suitable reactive silicon compound and to a temperature sufficient to convert the organic compound to an acetylenic compound by removal of the elements of a hydrogen halide, e. g. HCl. Surprisingly, there are obtained by this process organosilicon products containing an unsaturated carbon-carbon bond, of which dichlorovinyl trichlorosilane is a specific example.

The organic compounds which I may employ as starting materials in my novel process may be either saturated or unsaturated, but must be capable of conversion to acetylenic compounds by processes involving the removal of hydrogen chloride or the like. Thus, trichloroethylene, $CCl_2=CHCl$, has a double bond between two carbon atoms, of which one carries a hydrogen, the other a chlorine atom. Removal of HCl then yields the acetylenic compound $CCl\equiv CCl$, dichloroacetylene. In the case of carbons joined by a single bond, i. e. a paraffinic compound, there must be two hydrogens and two halogens, suitably situated so that on pyrolysis and removal of two molecules of HCl there is formed an acetylenic bond. Two halogens and two hydrogens may be located on adjacent carbon atoms, or one halogen and one hydrogen may be bonded to each of two adjacent carbon atoms, as will be more fully shown hereinbelow. In all cases, the organic compound, which initially contains no acetylenic linkage, contains adjacent carbon atoms carrying respectively hydrogen and halogen atoms, and is capable of forming an acetylenic bond by elimination of hydrogen halide.

Particularly at the high temperature employed, acetylenic compounds such as may be produced on heating my organic starting materials to the point of removal of hydrogen halide tend to interreact vigorously or even explosively. For example, I have on some occasions found that explosions occurred on heating trichloroethylene to 500–550° C. On other occasions, passing a current of trichloroethylene in vapor form through a tube heated to 500–550° C. has resulted in the production of quantities, sufficient in many cases to cause plugging of the tube, of a white solid which was identified as hexachlorobenzene.

I have discovered, when my organic starting material is heated in the presence of a reactive silicon-containing compound such as trichlorosilane, that the reaction proceeds smoothly and safely, and that there is obtained as the principal reaction product an unsaturated organic silicon compound. In the case of trichloroethylene and trichlorosilane, the rereaction product is dichlorovinyl trichlorosilane.

Dichlorovinyl trichlorosilane and other analogous products obtained by the process and procedure of my invention are chemical compounds of important utility. They may be converted to organic esters, by reaction with alcohols; for example, the above-named trichlorosilane has been reacted with methyl alcohol and with butyl alcohol to produce respectively the corresponding trialkoxy silanes. They may be converted to alkyl silanes or the like, as by reaction of the trichlorosilane with Grignard reagents. Other reactions, and other end products, are contemplated.

Another important field of utility for the products of this invention lies in the formation of resinous or polymeric masses. The unsaturated organic halosilane product is first hydrolyzed to produce the unstable hydroxysilane, which on heating splits out water to form resinous products having a siloxane structure. Somewhat analogous reactions may also be carried out by way of the products obtained, for example, by ammonolysis (or, more broadly, aminolysis) of the chlorosilane, and having a silazine structure. For example, the unsaturated organic chlorosilane may be reacted with anhydrous ammonia to produce an aminosilane having —NH$_2$ groups attached to silicon, which on heating splits out ammonia with the production of nitrogen-containing resinous or polymeric products. In all of these products, the presence of the unsaturated carbon-carbon bond in the organic portion of the molecule provides novel and advantageous properties.

The following specific examples will further describe my invention, which, however, is not to be limited thereby.

*Example 1*

Trichloroethylene (35 g.) and trichlorosilane (25 g.), both freshly distilled, were mixed and passed through a Pyrex glass tube in 3 hours. The tube had a nominal internal diameter of 9 mm. and was indented to provide improved heat transfer. It was heated over about 7 inches of its length with an electric furnace, the temperature being recorded by a thermocouple placed in the furnace near the surface of the tube. With the temperature at about 490° C., 50.3 g. of an amber liquid product was obtained. Some unreacted HSiCl$_3$ was recovered, and HCl was evolved during the reaction. By fractionation there was obtained a colorless liquid having the following properties:

Boiling point_____ 52° C. (8 mm.)
Refractive index_____ $n_D^{20}=1.4942$

Analysis:

|  | Active Cl | Total Cl | Si |
|---|---|---|---|
| Found | 46.5 | 77.1 | 12.21 |
| Calc'd., C$_2$HCl$_2$SiCl$_3$ | 46.2 | 77.6 | 12.15 |

These properties identify the product as dichlorovinyl trichlorosilane.

In the analysis, active chlorine was determined by direct titration with standard base, total chlorine by fusion with sodium peroxide followed by potentiometric titration, and the silicon by acid digestion of the sample followed by ignition to constant weight.

At atmospheric pressure the product boiled at 159° C. (729 mm.) with gradual evolution of HCl. Still higher temperatures, and longer times of heating, promote the loss of HCl and provide a means for further reaction with additional HSiCl$_3$ to form compounds in which the carbon atoms of the ethylenic group are bonded to two silicon atoms. Such a reaction serves to explain the formation of the small amount of high-boiling residue normally found in the products recovered from the hot tube.

Further reactions were carried out with the product of Example 1.

*Example 2*

Anhydrous methanol (15 g.) was added dropwise to 21 grams of the dichlorovinyl trichlorosilane product of Example 1 in a 50 cc. Claisen flask. The mixture was refluxed gently for 15 minutes after addition was completed. On fractionation there was recovered 8.0 g. of a product having a boiling point of 104–105° C. (50 mm.), refractive index 1.4421, analyzing 33.2% chlorine, 12.95% silicon, and identified as dichlorovinyl trimethoxysilane. Calculated values for this compound are 32.7% Cl, 12.92% Si.

Parallel reaction of the trichlorosilane product with n-butanol yielded dichlorovinyl tributoxysilane, B. P. 163–165° C. (10 mm.), $$n_D^{20}=1.4434$$

Analysis:

|  | Total Cl | Si |
|---|---|---|
| Found | 21.2 | 8.27 |
| Calc'd for C$_2$HCl$_2$Si(OC$_4$H$_9$)$_3$ | 20.7 | 8.17 |

*Example 3*

Acid hydrolysis of either the methoxy or the butoxy compound as prepared in Example 2, followed by heating at 175° C., produced tough glassy resins.

*Example 4*

Slow addition of dichlorovinyl trichlorosilane in ether to cold ethyl magnesium bromide (Grignard reagent) yielded after hydrolysis and fractionation, dichlorovinyl triethylsilane, B. P. 97–99° C. (14 mm.), $n_D^{20}=1.4780$.

Analysis: Total Cl
Found _____ 33.1
Calc'd. for C$_2$HCl$_2$Si(C$_2$H$_5$)$_3$ _____ 33.6

*Example 5*

Dry chlorine was added in increments to an ice-cold solution of the dichlorovinyl trichlorosilane in chloroform, reaction being accomplished after each addition by allowing the mixture to warm up under exposure to sunlight. The liquid obtained after careful distillation boiled at 104–106° C. (17 mm.) and had a refractive index of $n_D^{27}=1.5149$. Analysis showed the product to be 1,1,2,2-tetrachloroethyl trichlorosilane.

*Example 6*

Tetrachloroethane (26.5 g.) was passed through the reaction tube of Example 1 in the presence of trichlorsilane (26.0 g.) and at a temperature of 500–550° C. during 1½ hours, with the production of dichlorovinyl trichlorosilane and elimination of two mols of hydrogen chloride.

*Example 7*

A mixture of 26 g. of tribromoethylene and 34 g. of trichlorosilane was passed through the tube at 475° C. during 110 minutes. The purified product boiled at 76–77° C. (11 mm.), had a refractive index of $n_D^{26.3}=1.5230$, and was identified as bromo trichlorosilyl acetylene.

Analysis:

|  | Total halogen as Cl | Active Cl | Si |
|---|---|---|---|
| Found | 59.9 | 44.9 | 11.7 |
| Calc'd as C$_2$BrSiCl$_3$ | 59.6 | 44.5 | 11.7 |

There was also obtained a small amount of a high-boiling residue, presumably formed by the addition of a molecule of trichlorosilane to the bromo trichlorosilyl acetylene. This addition is apparently much less rapid than the addition of trichlorosilane to the much more reactive dibromoacetylene.

Example 8

Vinylidene chloride (33.7 g.) and trichlorosilane (46.5 g.) were mixed and passed through a tube at about 500° C. during 100 minutes. The purified liquid product boiled at 59° C. (59 mm.), and had a refractive index $n_D^{23}=1.4610$.

Analysis:

|  | Active Cl | Si |
|---|---|---|
| Found | 54.9 | 13.9 |
| Calc'd for $C_2H_2SiCl_4$ | 54.4 | 14.3 |

Hydrolysis, and heating of the residue at 60° C. for several hours, yielded a moderately tough resinous product.

Example 9

Butylidene chloride (20 g.) and trichlorosilane (18.7 g.) were mixed and heated to 650–675° C. in the apparatus of Example 1, over a period of one hour. There was recovered an unsaturated organosilicon chloride addition product.

Example 10

In order to illustrate the effect of temperature on these reactions, trichloroethylene was heated at various temperatures and the extent of conversion to dichloroacetylene was determined, by measuring the percent of HCl evolved. During this determination, quantities of hexachlorobenzene, a white solid melting at 226° C., were obtained by polymerization of the dichloroacetylene.

| Temp. ° C.: | Percent HCl evolved |
|---|---|
| 460 | 6.1 |
| 500 | 31.0 |
| 530 | 67.0 |

The optimum temperature, at least in the absence of a catalyst as in the present example, would thus be 500–550° C. At lower temperatures, the unreacted trichloroethylene may be recovered and recirculated. With some compounds, this procedure may be preferable in minimizing undesirable side reactions.

Trichlorosilane, $HSiCl_3$, is shown in the examples, but any equivalent reactive substituted silane, disilane or the like may be employed with equal facility. Representative of such silicon hydrohalide compounds are $H_2SiCl_2$, $HSiBr_3$, $HSiCl_2C_2H_5$, $HSi_2Cl_5$, etc. Other reactants and other procedures for carrying out the teachings of this invention will be apparent to those skilled in the art, in view of the disclosures herein made, and all such modifications are contemplated as coming within the scope of my invention.

What I claim is:

1. A process for the preparation of organosilicon compounds having silicon bonded directly to carbon and containing an unsaturated carbon-to-carbon bond, which comprises heating an organic compound of the class consisting of RCX₂—CH₂R', RCHX—CHXR, and

RCX=CHR' where R and R' are members of the class consisting of hydrocarbon radicals, halogen, and hydrogen, and X is halogen, in the presence of a compound of the formula $H_aSi_nY_b$, where each Y is a member of the class consisting of halogen and alkyl, and at least one Y is halogen, n is an integer from 1 to 2, and a and b are integers totaling 2n+2, at a temperature of the order of about 500° C. and sufficient to form an acetylenic bond in said organic compound by elimination of hydrogen halide.

2. A process for the preparation of organosilicon compounds having silicon bonded directly to carbon and containing an unsaturated carbon-to-carbon bond, which comprises heating an organic compound of the class consisting of RCX₂—CH₂R', RCHX—CHXR', and

RCX=CHR' where R and R' are members of the class consisting of hydrocarbon radicals, halogen and hydrogen, and X is halogen, in the presence of trichlorosilane, at a temperature of the order of about 500° C. and sufficient to form an acetylenic bond in said organic compound by elimination of hydrogen halide.

3. A process for the preparation of organosilicon compounds having silicon bonded directly to carbon and containing an unsaturated carbon-to-carbon bond, which comprises heating an organic compound of the class consisting of RCX₂—CH₂R', RCHX—CHXR' and

RCX=CHR' where R and R' are members of the class consisting of hydrocarbon radicals, halogen, and hydrogen, and X is halogen, in the presence of trichlorosilane, at a temperature of the order of about 500° C. and sufficient to form an acetylenic bond in said organic compound by elimination of hydrogen halide.

4. A process for the preparation of dichlorovinyl trichlorosilane which comprises heating trichloroethylene in the presence of trichlorosilane at a temperature of the order of 500° C.

5. A process for the preparation of bromo trichlorosilyl acetylene which comprises heating tribromoethylene in the presence of trichlorosilane at a temperature of the order of 500° C.

6. Organosilicon esters of an aliphatic alcohol and an unsaturated organosilicon halide compound prepared by heating an organic compound of the class consisting of RCX₂—CH₂R',

RCHX—CHXR' and RCX=CHR', where R and R' are members of the class consisting of hydrocarbon radicals, halogen, and hydrogen, and X is halogen, in the presence of a compound of the formula $H_aSi_nY_b$, where each Y is a member of the class consisting of halogen and alkyl and at least one Y is halogen, n is an integer of from 1 to 2, and a and b are integers totaling 2n+2, at a temperature of the order of 500° C. and sufficient to form an acetylenic bond in said organic compound by elimination of hydrogen halide.

7. Organosilicon compounds of unsaturated organosilicon halide compounds prepared by heating an organic compound of the class consisting of RCX₂—CH₂R', RCHX—CHXR', and RCX=CHR', where R and R' are members of the class consisting of hydrocarbon radicals, halogen, and hydrogen, and X is halogen, in the presence of a compound of the formula $H_aSi_nY_b$, where each Y is a member of the class consisting of halogen and alkyl and at least one Y is halogen, n is an integer of from 1 to 2, and a and b are integers totaling 2n+2, at a temperature of the order of 500° C. and sufficient to form an acetylenic bond in said organic compound by elimination of hydrogen halide.

8. Resinous siloxane condensation products prepared by hydrolyzing silicon-halogen linkages of unsaturated organosilicon halide compounds, and resinifying the resultant hydrolysis products by intermolecular condensation with liberation of water, said unsaturated organosilicon halide compounds being prepared by heating an organic compound of the class consisting of $$RCX_2-CH_2R', RCHX-CHXR', \text{ and } RCX=CHR'$$

where R and R' are members of the class consisting of hydrocarbon radicals, halogen, and hydrogen, and X is halogen, in the presence of a compound of the formula $H_aSi_nY_b$, where each Y is a member of the class consisting of halogen and alkyl and at least one Y is halogen, $n$ is an integer of from 1 to 2, and $a$ and $b$ are integers totaling $2n+2$, at a temperature of the order of 500° C. and sufficient to form an acetylenic bond in said organic compound by elimination of hydrogen halide.

9. Resinous silazine condensation products prepared by aminolysis of silicon-halogen linkages of unsaturated organosilicon halide compounds, and resinifying the resulting aminolysis product by intermolecular condensation with liberation of ammonia, said unsaturated organosilicon halide compounds being prepared by heating an organic compound of the class consisting of $$RCX_2-CH_2R', RCHX-CHXR', \text{ and } RCX=CHR'$$

where R and R' are members of the class consisting of hydrocarbon radicals, halogen, and hydrogen, and X is halogen, in the presence of a compound of the formula $H_aSi_nY_b$, where each Y is a member of the class consisting of halogen and alkyl and at least one Y is halogen, $n$ is an integer of from 1 to 2, and $a$ and $b$ are integers totaling $2n+2$, at a temperature of the order of 500° C. and sufficient to form an acetylenic bond in said organic compound by elimination of hydrogen halide.

10. Dichlorovinyl trichlorosilane, as produced in accordance with the process of claim 4.

References Cited in the file of this patent

UNITED STATES PATENTS

| Number | Name | Date |
|---|---|---|
| 2,379,821 | Miller | July 3, 1945 |
| 2,381,138 | Patnode | Aug. 7, 1945 |
| 2,411,142 | Kelso et al. | Nov. 19, 1946 |
| 2,426,122 | Rust | Aug. 19, 1947 |
| 2,432,891 | Hervey | Dec. 16, 1947 |

FOREIGN PATENTS

| Number | Country | Date |
|---|---|---|
| 575,530 | Great Britain | Feb. 21, 1946 |

OTHER REFERENCES

Agre, "Jour. Am. Chem. Soc.," vol. 71 (1949), pages 300–304.

Wagner, "Jour. Am. Chem. Soc.," vol. 71 (1949), pages 3567, 3568.